Sept. 3, 1957 K. L. BELL 2,805,332

SUBMINIATURE PORTABLE CRYSTAL RADIO RECEIVER

Filed Jan. 20, 1955

INVENTOR

Keith L. Bell.

BY Gustave Miller.

ATTORNEY 2,805,332

SUBMINIATURE PORTABLE CRYSTAL RADIO RECEIVER

Keith L. Bell, Washington, D. C., assignor of one-half to Gustave Miller, Washington, D. C.

Application January 20, 1955, Serial No. 483,103

19 Claims. (Cl. 250—20)

This invention relates to radio receivers, and more particularly to a radio receiver of the subminiature type adapted to be carried or worn on the person of the user.

Many types of small portable radio receivers have been devised, some of which include battery power supplies and vacuum tube detecting and amplifying means, and others of the crystal detector type and without batteries or amplifying means. The receivers of the type including batteries have in general been cumbersome and too large in size to be conveniently carried or worn on the person. Prior receivers of the crystal detector type without batteries or amplifying means have been unable to deliver sufficient volume to prove satisfactory to the user, even when turned to a powerful transmitter a few miles distant.

There is a real need in many fields for a small miniature radio receiver adapted to be worn or carried on the person. In the military services, and in civil defense work, for example, such receivers would have widespread use for transmitting intelligence to soldiers or civil defense workers. Miniature radio receivers adapted to be plugged into the ear, for example, could also find great utility in connection with public activities, such as football games, in which spectators equipped with such radio receivers could receive a running description of the game to supplement their visual impressions.

Accordingly, it is an object of this invention to provide a radio receiver of the subminiature type which provides a strong clear signal without requiring the use of batteries or amplifying means, such as vacuum tubes or transistors.

It is a further object of this invention to provide a radio receiver of the subminiature type which is light in weight and inexpensive to manufacture.

In achievement of these objectives, there is provided in accordance with this invention a miniature radio receiver of the crystal detector type in which an inductive tuning winding is carried by the diaphragm member which produces the sound waves, the audio frequency currents produced by the rectifying action of the crystal detector passing through the inductive winding and reacting with a permanent magnet field to provide a dynamic speaker action. The powdered magnetized metal forming the permanent magnet field, in addition to providing a dynamic speaker action by its reaction with the audio frequency current passing through the inductive winding also provides permeability tuning of the radio frequencies in the inductive winding. In one embodiment of the invention, the permanent magnet field means is adjustably spaced with respect to the inductive winding to permit tuning the receiving circuit to a desired frequency. In another embodiment of the invention, the permanent magnet field remains fixed with respect to the inductive winding, the spacing of the permanent magnets with respect to the inductive winding being such as to provide resonance at a predetermined frequency. The permanent magnet field is preferably provided by magnetically oriented permanent magnet particles held in a binder or holder of non-metallic plastic or ceramic material.

Further objects and advantages of the invention will become apparent from the following description taken in conjunction with the accompanying drawings in which.

Figures 1, 2:
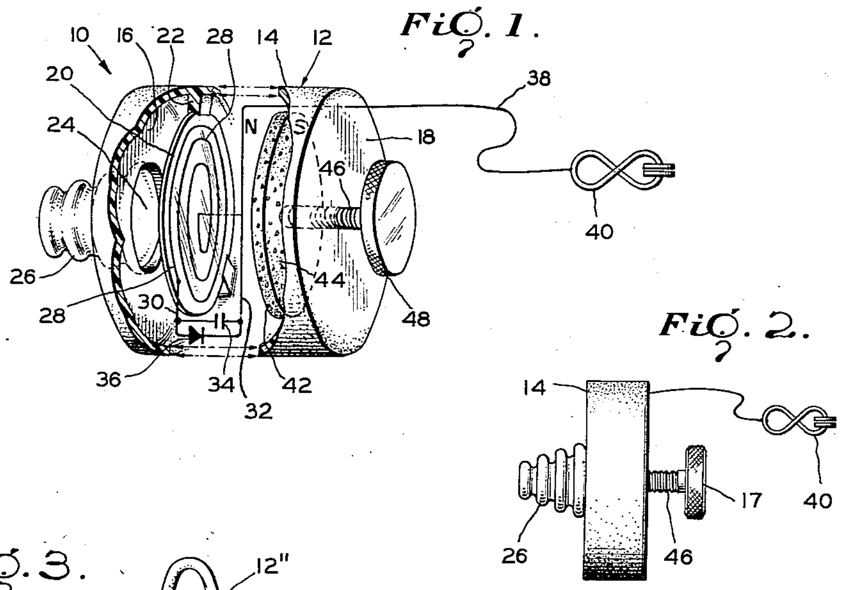
Fig. 1 is a perspective view, partially diagrammatic and schematic, of a miniature radio receiver in accordance with one embodiment of the invention.
Fig. 2 is a side elevation view of the radio receiver of Fig. 1.

Referring now to the drawing, and more particularly to Figs. 1 and 2, there is shown a subminiature radio receiver generally indicated at 10 and comprising a casing or housing 12 preferably formed of plastic or other dielectric material and including a body portion 14, which may be generally cylindrical in shape, and end walls 16 and 18. Disposed within casing 12, and preferably lying in a plane generally parallel to end walls 16 and 18, is a very thin dielectric disk member 20. Disk 20 is disposed adjacent but spaced from end wall 16 and is supported with respect to casing 12 by a suitable retaining means indicated at 22. End wall 16 is provided with an aperture 24 located on the longitudinal axis of housing 12, and a hollow, sound conducting ear plug 26, formed of rubber or other suitable material, is connected over aperture 24.

An inductive winding 28 in the form of an electrically conductive non-magnetic spiral is positioned on one surface of disk 20, winding 28 preferably being positioned on the disk by any of the well known methods of printed circuitry and becomes magnetic only when current is flowing in it. The two ends of winding 28 are connected by conductors 30 and 32 to opposite sides of a germanium diode detector 36. A radio frequency by-pass condenser 34 is connected in parallel with detector 36 across conductors 30 and 32. The use of by-pass condenser 34 is optional, but the condenser is preferably employed to minimize any tendency of the unrectified radio frequency current components to block the crystal detector 36. This tendency to block occurs particularly at very high radio frequencies, such as those encountered in frequency modulation reception. This by-pass capacitor also partially tunes the spiral inductance. One end of winding 28 is also connected by means of a conductor 38 to a metallic ear clip 40 which is positioned exteriorly of casing 12 and is adapted to be clipped onto the ear of the user to permit the body of the user to serve as an antenna.

Disposed adjacent disk 20 but in spaced relation thereto is a disk 42 made of plastic or other suitable dielectric material. Embedded in disk 42 are powdered metal particles 44 which are permanently magnetized in the direction N–S, preferably along an axis perpendicular to the plane of disk 20 and inductance 28. Disk 42 is mounted on and carried by a threaded rod or shaft 46 which passes through a threaded bearing in end wall 18 of the housing. A knurled operating knob 48 is connected to the outer end of rod 46 exteriorly of the housing.

In using the radio receiver shown in Figs. 1 and 2, the user inserts ear plug 26 in his ear, and fastens ear clip 40 to an ear lobe. The connection of ear clip 40 to the ear lobe provides an antenna connection to the tuning circuit comprising spiral inductive winding 28 with the listener's body serving as an antenna. Tuning to the desired frequency is accomplished by turning knob 48 to rotate shaft 46 and thus move disk 42 axially with respect to disk 20 and winding 28. Movement of disk 42 with respect to winding 28 changes the inductance value of winding 28 due to the change in the spacing of the ferrous particles 44 with respect to the winding 28, thereby varying the frequency to which the circuit is tuned.

Diode detector 36 rectifies the radio frequency signal and produces audio frequency currents in accordance with the audio modulation of the radio frequency carrier. These audio frequency currents flow through winding 28 and produce a magnetic field which reacts with the permanent magnet field produced by ferromagnetic particles 44 in disk 42. The reaction of these two magnet fields with each other provides a dynamic speaker action which vibrates disk 20 and produces sound waves. These sound waves pass through aperture 24 in end wall 16 and through plug 26 to the ear of the listener.

Volume control is obtained in the embodiment of Fig. 1 by adjusting disk 42 to be just slightly off the position which produces peak resonance in the tuning circuit.

The radio receiver herein before described will receive amplitude modulated radio signals and will also satisfactorily receive frequency modulated broadcasts which are modulated by voice frequencies or other frequency modulated signals of a relatively narrow range of modulation.

Figure 3:
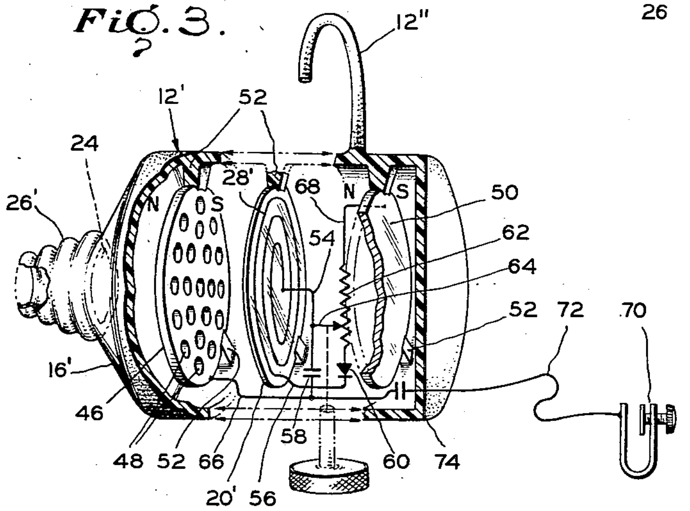
Fig. 3 is a perspective view, partially diagrammatic and schematic, and with the casing broken away, of a modified radio receiver in accordance with the invention.

The embodiment shown in Fig. 3 includes a housing 12′ made of plastic or other suitable material and an ear plug 26′ both generally similar to those described in the embodiment of Fig. 1. Positioned with housing 12′ substantially centrally of the longitudinal axis thereof, and perpendicular to that axis, is a very thin dielectric disk 20′ having positioned on a surface thereof substantially perpendicular to the longitudinal axis an inductive winding 28′, both the disk 20′ and winding 28′ being similar to those previously described in connection with the embodiment of Fig. 1. A hook 12″ which is part of the casing 12′ is provided to loop over the ear to support the radio receiver.

Positioned within casing 12′ adjacent the end wall 16′ to which ear plug 26′ is connected and in spaced relation to disk 20′ is a highly magnetized thin metal disk 46 having numerous perforations 48 therethrough. Disposed on the other side of disk 20′ and in spaced relation thereto is a thin solid metal disk 50 which is also highly magnetized. Disks 20′, 46 and 50 are supported with respect to housing 12′ by suitable supports indicated at 52.

The opposite ends of winding 28′ on disk 20 are connected by conductors 54 and 56 to the opposite sides of a radio frequency by-pass capacitor 58. One side of a germanium diode or other suitable solid state detector 60 is connected to conductor 56 and thus to one side of capacitor 58 and to one end of winding 28′. The other side of germanium diode detector 60 is connected to the stator 62 of a volume control resistor. The rotor 64 of the volume control resistor is connected to conductor 54 and thus to one side of capacitor 58 and to one end of winding 28′. Rotor 64 projects through the casing 12 to the exterior of the casing where it is accessible for manual operation.

In order to utilize the capacitance between disks 46 and 50 in the tuning circuit, disk 46 is connected by conductor 66 to conductor 56 and thus to one end of winding 28′. Disk 50 is connected by conductor 68 to one end of the stator resistor 62 of the volume control and thence through rotor 64 to the opposite side of winding 28′. Thus, the capacitance between plates 46 and 50 is connected in parallel with winding 28′. Disks 46 and 50 serve as permeability tuners due to the fact that they are formed of magnetic material and thus affect the inductance of winding 28′. In the embodiment shown, disks 46 and 50 are fixed with respect to winding 28′, thereby causing the inductive tuning circuit to be resonant at a fixed frequency. However, obviously, disks 46 and 50 could be made movable with respect to spiral winding 28′, thereby permitting tuning to different frequencies. Also, the disks 46 and 50 could be of the type shown in Fig. 1 in which permanently magnetized ferrous particles are embedded in a dielectric material.

An ear clasp 70 having a screw threaded clamping element for engagement with the ear lobe of the listener is disposed exteriorly of casing 12′. Ear clasp 70 is connected to the tuned circuit by conductor 72. An antenna coupling capacitor 74 is connected in series with conductor 72 between ear clasp 70 and the very sensitive detector 60. When ear clasp 70 is connected to the ear lobe of the listener, the body of the listener then serves as an antenna and is connected to the tuning circuit.

The audio modulations of the radio frequency carrier are detected and rectified by germanium diode detector 60. The rectified audio currents pass through conductive spiral 28′ on dielectric disk 20 and react with the permanent magnet field of magnetized disks 46 and 50. Disk 20′ then vibrates as a dynamic speaker element to produce sound waves which pass through the perforations 48 of disk 46 and thence through aperture 24′ and ear plug 26′ to the ear of the listener.

The capacitance and permeability inductance values of the embodiment of Fig. 3 preferably remain fixed, so that the receiver remains tuned to a single predetermined frequency. Volume control is obtained by adjustment of the rotor 64 of the resistor, rotor 64 being accessible to the listener from the exterior of the casing.

Figure 4:
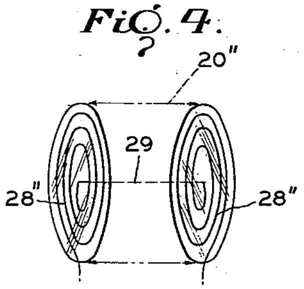
Fig. 4 is a side elevation view of a modified type of diaphragm having an inductance carried by both surfaces of the diaphragm.

As shown in Fig. 4, the conductive spirals 28 and 28′ on the disks 20 and 20′ may be positioned on both major surfaces of the disk. When this is done, the two conductive spirals 28″ are connected in series with each other, as, for example, by a conductor 29 passing through the disk 20″.

Figure 5:
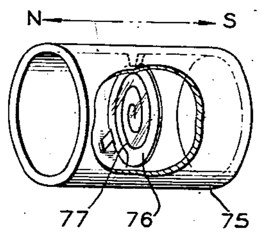
Fig. 5 is a side elevation view of a still further modified type of receiver in which the permanent magnet field is in the form of a hollow tubular member which surrounds the inductive tuning winding.

As shown in Fig. 5, the permanent magnet field may be provided by a permanently magnetized hollow tubular member 75 of magnetic material which surrounds the dielectric disk 76 on which the inductive winding 77 is positioned. Tubular member 75 may be of plastic containing magnetized particles. Disk 76 is disposed within the magnetized tube 75 substantially midway of the length of the tube. Tube 75 is preferably magnetized along its longitudinal axis, so that one end is a north pole and the opposite end is a south pole. Winding 77 is connected to a solid state rectifier, such as a germanium rectifier, as previously described. Winding 77 is also provided with an antenna connection such as those previously described. The rectified audio component of the radio frequency signal passes through winding 77 and sets up a magnetic field which reacts with the magnetic field provided by the permanently magnetized tubular member 75. The reaction of the two fields causes a vibration of the disk 76 to provide a dynamic speaker action.

It can be seen from the foregoing that there is provided in accordance with this invention a miniature radio receiver which is simple in construction and economical to manufacture and sell. The radio receiver requires no batteries for its operation, and provides a dynamic speaker action due to the position of the current carrying inductive winding on the diaphragm member relative to the permanent magnet field.

While there have been shown and described particular embodiments of the invention, it will be obvious to those skilled in the art that various changes and modifications may be made therein without departing from the invention, and, therefore, it is aimed to cover all such changes and modifications as fall within the true spirit and scope of the invention such as the employment of three or four contact germanium elements instead of the dual contact detector element shown. Furthermore, if desired a silicon strip sun operated battery could be employed with this invention where amplification is desirable. A still further modification may be employed wherein the detected audio currents may be employed to power a signal amplifying transistor in accordance with this invention.

Having thus set forth and disclosed the nature of this invention, what is claimed is:

1. A subminiature radio receiver comprising a casing, a thin diaphragm of dielectric material disposed within said casing and inductive tuning winding carried by said diaphragm for receiving a radio frequency signal, means for providing a low reluctance permanent magnet field having low core losses at radio frequencies adjacent said winding, and means connected in circuit with said winding to detect an audio frequency component of a radio frequency signal and feed said audio frequency back to said tuning winding, said audio frequency component reacting with said permanent magnet field to dynamically reproduce audible sound.

2. A subminiature radio receiver comprising a casing, a thin diaphragm of dielectric material disposed within said casing, an inductive tuning winding carried by said diaphragm, a low reluctance permanent magnet field means having low core losses at radio frequencies disposed in said casing adjacent said winding, and means connected in circuit with said winding to detect an audio frequency component of a radio frequency signal and feed said audio frequency component back to said tuning winding, said audio component co-acting with said permanent magnet field to dynamically vibrate said diaphragm according to said audio component.

3. A miniature radio receiver as defined in claim 2 in which said magnet field means is adjustably movable with respect to said winding to vary the resonant frequency of said tuning winding.

4. A miniature radio receiver as defined in claim 2 in which said magnet field means is disposed on opposite sides of said inductive winding.

5. A miniature radio receiver as defined in claim 2 in which said magnet field means is in fixed spaced relation to said winding whereby said winding remains tuned to a predetermined fixed frequency.

6. A miniature radio receiver comprising a casing, a thin diaphragm of dielectric material disposed within said casing, an inductive tuning winding carried by said diaphragm and adapted for connection to an antenna means for receiving a radio frequency signal, means for providing a permanent magnet field having low core losses at radio frequencies adjacent said winding, and means connected in circuit with said winding to detect an audio frequency component of said radio frequency signal and feed said audio frequency component back to said tuning winding.

7. A miniature radio receiver comprising a casing, a diaphragm of dielectric material disposed within said casing, an inductive tuning winding carried by said diaphragm for receiving a radio frequency signal, a low reluctance permeability tuning means having low losses at radio frequencies disposed within said casing adjacent said winding, and means connected in circuit with said winding to detect an audio frequency component of said radio frequency signal and feed said audio frequency component back to said tuning winding.

8. A miniature radio receiver comprising a casing, a diaphragm of dielectric material disposed within said casing, an inductive tuning winding carried by said diaphragm and adapted for connection to an antenna means for receiving a radio frequency signal, a low reluctance permeability tuning means having low losses at radio frequencies disposed within said casing adjacent said winding, said permeability tuning means being adjustably movable with respect to said winding to vary the resonant frequency of said winding, and means connected in circuit with said winding to detect an audio frequency component of said radio frequency signal and feed said audio frequency component back to said tuning winding.

9. A miniature radio receiver comprising a casing, a diaphragm of dielectric material disposed within said casing, an inductive tuning winding carried by said diaphragm for receiving a radio frequency signal, a permanently magnetized permeability tuning means having low losses at radio frequencies disposed within said casing adjacent said winding, and means connected in circuit with said winding to detect an audio frequency component of said radio frequency signal and feed said audio frequency component back to said tuning winding.

10. A miniature radio receiver comprising a casing, a thin diaphragm of dielectric material disposed within said casing, an inductive tuning winding carried by said diaphragm and adapted for connection to an antenna means for receiving a radio frequency signal, permanent magnet means having low losses at radio frequencies disposed in said casing adjacent said winding, and means connected in circuit with said winding to detect an audio frequency component of said radio frequency signal and feed said audio frequency component back to said tuning winding.

11. A miniature radio receiver comprising a casing, a thin diaphragm of dielectric material disposed within said casing, an inductive tuning winding carried by said diaphragm, means disposed in said casing for providing a low reluctance magnetic field adjacent said winding having low losses at radio frequencies, and solid state rectifier means connected in circuit with said winding to detect an audio frequency component of a radio frequency signal and feed said audio frequency component back to said tuning winding.

12. A miniature radio receiver comprising a casing, a diaphragm of dielectric material disposed within said casing, an inductive tuning winding carried by said diaphragm for receiving a radio frequency signal, a magnetic permeability tuning means having low losses at radio frequencies disposed within said casing adjacent said winding, and a solid state rectifying means disposed within said casing and connected in circuit with said winding to detect an audio frequency component of said radio frequency signal and feed said audio frequency component back to said tuning winding.

13. A miniature radio receiver comprising a casing, a diaphragm of dielectric material disposed within said casing, an inductive tuning winding carried by said diaphragm and adapted for connection to an antenna means for receiving a radio frequency signal, magnet means having low losses at radio frequencies disposed within said casing adjacent but spaced from said diaphragm, means for varying the spacing of said magnet means from said winding, and means connected in circuit with said winding to detect an audio frequency component of said radio frequency signal and feed said audio frequency component back to said tuning winding.

14. A miniature radio receiver comprising a casing, a diaphragm of dielectric material disposed within said casing, an inductive tuning winding carried by said diaphragm and adapted for connection to an antenna means for receiving a radio frequency signal, permanent magnet means disposed in said casing adjacent said winding, said magnet means including a plurality of similarly oriented magnetic particles embedded in a non-magnetic holding means, and means connected in circuit with said winding to detect an audio frequency component of said radio frequency signal and feed said audio frequency component back to said tuning winding.

15. A miniature radio receiver as defined in claim 14, in which said magnet means is adjustably movable with respect to said winding to vary the resonant frequency of said tuning winding.

16. A miniature radio receiver as defined in claim 14 in which said magnet means is disposed on opposite sides of said inductive winding.

17. A miniature radio receiver as defined in claim 14 in which said magnet means is in fixed spaced relation to said winding whereby said winding remains tuned to a predetermined fixed frequency.

18. A miniature radio receiver comprising a casing, a diaphragm of dielectric material disposed within said casing, an inductive tuning winding carried by said diaphragm and adapted for connection to an antenna means for receiving a radio frequency signal, a generally hollow cylindrical permanent magnet member disposed within said casing, said diaphragm being positioned within the hollow interior of said magnet member, and means connected in circuit with said winding to detect an audio frequency component of said radio frequency signal and feed said audio frequency component back to said tuning winding.

19. A miniature radio receiver comprising a casing, a diaphragm of dielectric material disposed within said casing, an inductive tuning winding carried by said diaphragm and adapted for connection to an antenna means for receiving a radio frequency signal, a generally hollow cylindrical permanent magnet member disposed within said casing, said diaphragm being positioned within the hollow interior of said cylindrical magnet member in a plane substantially perpendicular to the longitudinal axis of said magnet, and means connected in circuit with said winding to detect an audio frequency component of said radio frequency signal and feed said audio frequency component back to said tuning winding.

References Cited in the file of this patent

UNITED STATES PATENTS

| | | |
|---|---|---|
| 314,156 | Taylor | Mar. 17, 1885 |
| 407,799 | Trowbridge et al. | July 30, 1889 |
| 1,219,888 | Wallberg | Mar. 20, 1917 |
| 1,687,371 | Leeper | Oct. 9, 1928 |
| 2,554,270 | Rosenberg | May 22, 1951 |
| 2,576,679 | Guillaud | Nov. 27, 1951 |

FOREIGN PATENTS

| | | |
|---|---|---|
| 204,663 | Great Britain | Oct. 4, 1923 |